US012783841B2

(12) United States Patent
Fernandez Lopez et al.

(10) Patent No.: US 12,783,841 B2
(45) Date of Patent: Nov. 3, 2026

(54) METHODS FOR MANUFACTURING A MAGNETIC STRIPE OF A CARD-LIKE DATA CARRIER

(71) Applicant: Giesecke+Devrient ePayments GmbH, Munich (DE)

(72) Inventors: Oscar Miguel Fernandez Lopez, Barcelona (ES); Thomas Tarantino, Laufen (DE)

(73) Assignee: GIESECK+DEVRIENT EPAYMENTS GMBH, Munich (DE)

( * ) Notice: Subject to any disclaimer, the term of this patent is extended or adjusted under 35 U.S.C. 154(b) by 44 days.

(21) Appl. No.: 18/483,215

(22) Filed: Oct. 9, 2023

(65) Prior Publication Data

US 2024/0119247 A1 Apr. 11, 2024

(30) Foreign Application Priority Data

Oct. 10, 2022 (EP) .................................... 22382960

(51) Int. Cl.
*G06K 19/06* (2006.01)

(52) U.S. Cl.
CPC .............................. *G06K 19/06196* (2013.01)

(58) Field of Classification Search
CPC .................. G06K 19/06187; G06K 19/06196
See application file for complete search history.

(56) References Cited

U.S. PATENT DOCUMENTS 4,106,062 A * 8/1978 Foote .................... G06K 1/125 360/2
4,297,570 A * 10/1981 Kowalski .................. B32B 7/06 360/2
5,073,221 A * 12/1991 Waitts .............. G06K 19/06196 428/167
6,403,169 B1 * 6/2002 Hardwick ............. B42D 25/29 427/398.1
6,549,131 B1 * 4/2003 Cote ................ G06K 19/06196 428/209

(Continued)

FOREIGN PATENT DOCUMENTS

CA 1070835 A * 1/1980 ............ G06K 1/125
CH 688293 A5 7/1997

(Continued)

OTHER PUBLICATIONS

"What is screen printing? a step-by-step guide"; Custom Planet, https://web.archive.org/web/20210803173736/https://www.customplanet.co.uk/what-is-screen-printing-a-step-by-step-guide (Year: 2021).*

(Continued)

*Primary Examiner* — Laura A Gudorf
(74) *Attorney, Agent, or Firm* — Workman Nydegger

(57) ABSTRACT

Methods for manufacturing a magnetic stripe on a card element of a card-like data carrier. involve applying at least a portion of a magnetic stripe material layer onto a card element surface of the card element using different techniques. The application of the portion of the magnetic stripe material layer onto the card element surface generates a magnetic stripe on the card element surface such that the magnetic stripe has a stripe length that is less than a length of the card element surface and has a stripe width that is less than a width of the card element surface.

11 Claims, 5 Drawing Sheets

(56) References Cited

U.S. PATENT DOCUMENTS

| | | | | |
|---|---|---|---|---|
| 6,601,769 | B2 * | 8/2003 | Barnhill | G06K 19/08 235/487 |
| 7,156,301 | B1 | 1/2007 | Bonalle et al. | |
| 2007/0257107 | A1 | 11/2007 | Madani | |
| 2022/0305835 | A1 * | 9/2022 | Veya | B42D 25/387 |

FOREIGN PATENT DOCUMENTS

| | | | | | |
|---|---|---|---|---|---|
| EP | 3235651 | A1 | * | 10/2017 | B41M 5/0041 |
| GB | 1373856 | A | | 11/1974 | |
| JP | 2006027669 | A | * | 2/2006 | |
| WO | 0118745 | A2 | | 3/2001 | |
| WO | 0126030 | A2 | | 4/2001 | |
| WO | 2012071182 | A2 | | 5/2012 | |

OTHER PUBLICATIONS

Ebner, Claus, “Chapter 2: Smart Card Production Environment”, “Smart Cards, Tokens, Security And Applications”, Jan. 1, 2008, pp. 27-50.

ip.com, “Security elements, and methods and apparatus for their manufacture”, IP.com, Mar. 29, 2011.

Partial European Search Report from Corresponding European Patent Application No. EP22382960.7, Feb. 22, 2023.

Extended European Search Report from Corresponding European Patent Application No. EP22382960.7, Jul. 14, 2023.

* cited by examiner

METHODS FOR MANUFACTURING A MAGNETIC STRIPE OF A CARD-LIKE DATA CARRIER

TECHNICAL FIELD

The disclosure generally relates to the manufacture of magnetic stripes for data carrier cards, such as credit cards, smart cards, identification cards etc. In particular, the invention relates to methods for manufacturing a magnetic stripe of a card-like data carrier.

TECHNICAL BACKGROUND

Data carrier cards are used in various different applications. For example, bank cards like credit cards are used as payment cards which allow a user of the bank card to pay for purchased goods or services. Such data carrier cards often include a magnetic stripe and are therefore also known as magnetic stripe cards which are operable to store data by modifying a magnetism of magnetic particles which may be present in the form of a band of magnetic material on the card. This magnetic band or stripe can be read by swiping it past a magnetic reading device, for example a magnetic reading device of an automated teller machine (ATM) or cash machine. A further example for a data carrier card is an identification (ID) card which stores user-related data. Currently known manufacturing techniques for providing the magnetic stripe onto the card element of a data carrier card may be inefficient, in particular in terms of material usage and/or production times.

SUMMARY

It may be seen as an object of the invention to provide improved methods for manufacturing magnetic stripes for card-like data carriers.

Various methods according to the features of the independent claims are provided. Further embodiments are evident from the dependent claims and from the following description.

According to an aspect, a method for manufacturing a magnetic stripe of a card-like data carrier is provided. In a step of the method, a card element having a card element surface is provided. In a further step, a stamping element is provided spaced apart from the card element surface. In a further step, a magnetic stripe material layer is arranged between the card element surface and the stamping element. In yet a further step, at least a portion of the magnetic stripe material layer is pressed against the card element surface using the stamping element. In a further step, a heat amount is applied onto the portion of the magnetic stripe material layer using the stamping element, when pressing the portion of the magnetic stripe material layer against the card element surface. Pressing the portion of the magnetic stripe material layer against the card element surface generates a magnetic stripe on the card element surface such that the resulting magnetic stripe has a stripe length that is less than a length of the card element surface and has a stripe width that is less than a width of the card element surface.

With this inventive method, it is possible to provide a magnetic stripe on the card element which does not extend over the entire surface of the card element. In particular, it may be sufficient to provide the required information or data with the magnetic stripe even if the magnetic stripe has a reduced length and thus only partially extends over the upper or lower surface of the card element or card-like data carrier. For example, in order to be able to read a credit card and obtain all required information, an ATM might only need a few centimeters of magnetic stripe starting from the card edge, but not extending over the entire length of the card surface.

Therefore, the inventive methods described herein provide improved techniques for manufacturing magnetic stripes having a reduced length on the card-like data carrier.

The first method for manufacturing the magnetic stripe of the card-like data carrier described herein employs a stamping element that may be configured to stamp the magnetic stripe material onto the card element surface while a heat amount is applied onto the magnetic stripe material and/or a surface portion of the card element surface where the magnetic stripe material will be applied. In particular, the card element may represent the uppermost or lowermost layer of the card-like data carrier to be manufactured. Therefore, the card element may comprise a card-like structure or a foil-like structure which may be applied to a base structure of the card-like data carrier, as will be further explained below.

The stamping element is spaced apart from the card element surface and the magnetic stripe material layer is arranged between the card element surface and the stamping element. Afterwards, the stamping element may be moved towards the card element surface such that a stamping surface of the stamping element presses a portion of the magnetic stripe material layer onto the card element surface, i.e., the stamping element may exert a stamping force that pushes some of the magnetic material layer against a portion of the card element surface. This portion of the card element surface may only be a part of the card element surface where the magnetic stripe material layer is applied and where the magnetic stripe will be located after the manufacturing process. The stamping element may then be moved away from the card element surface and, afterwards, the card element may be moved relative to the stamping element such that the stamping element surface faces another portion of the same card element surface of said card element or a portion of a new card element surface of another card element.

It is noted that a heat amount is applied onto the portion of the magnetic stripe material layer using the stamping element, when pressing the portion of the magnetic stripe material layer against the card element surface. In particular, a temperature in a region around said portion of magnetic stripe material layer can be increased to facilitate attaching the portion of the magnetic stripe material layer onto the card element surface. The heat may be provided via the stamping element itself, for example via the stamping element surface, and transferred into the magnetic stripe material layer.

As explained above, the portion of the magnetic stripe material layer may be applied onto the card element surface, thereby generating the final shape of the magnetic stripe on the card element surface. In particular, the portion of the magnetic stripe may be applied to the card element surface such that the stripe length does not extend over the entire card element length, but rather extends only over a part of the card element length. The final magnetic stripe may also have a specified width that does also not extend over the entire width of the card element. In other words, the manufactured magnetic stripe is limited in its dimensions to only a smaller part within the card element surface.

According to an embodiment, pressing the portion of the magnetic stripe material layer against the card element surface comprises pressing only the portion of the magnetic stripe material layer that faces a stamping surface of the stamping element.

It is possible that the stamping surface comprises a planar surface with a surface area that is smaller than a surface area of the provided magnetic stripe material layer. Accordingly, when pressing the stamping surface against the magnetic stripe material layer and thus pressing the magnetic stripe material layer against the card element surface, only the portion of the magnetic stripe material layer will be stamped and pressed against the card element surface that is currently located between the stamping element surface and the card element surface. That is, the magnetic stripe will only be applied in a surface area on the card element surface where there was a pressing of magnetic stripe material layer. It is therefore possible that the magnetic stripe material layer will not be applied onto the card element surface in regions where the stamping element did not press the magnetic stripe material layer against the card element surface.

According to an embodiment, a further step comprises arranging the magnetic stripe material layer between a carrier substrate layer and a heat-activatable substrate layer, wherein pressing the portion of the magnetic stripe material layer against the card element surface comprises pressing the portion of the magnetic stripe material layer together with a portion of the carrier substrate layer and a portion of the heat-activatable substrate layer towards the card element surface. In this case, applying the heat amount onto the portion of the magnetic stripe material layer may comprise activating the portion of the heat-activatable substrate layer using the stamping element, thereby providing an adhesion or adhesion force between the portion of the magnetic stripe material layer and the card element surface, which may attach the resulting magnetic stripe to the card element.

For example, the magnetic stripe material layer may be sandwiched between the carrier substrate layer and the heat-activatable substrate layer. In particular, the magnetic stripe material layer may be coated on one side with the heat-activatable substrate layer. The carrier substrate layer may act as a carrier, protection or form stabilizer for the magnetic stripe material layer and/or the heat-activatable substrate layer may act as an adhesive for attaching the magnetic stripe material layer to the card element surface when being activated. In particular, the heat-activatable substrate layer may be activated by the heat amount provided by the stamping element. The heat may thus be transferred via the magnetic stripe material layer to the heat-activatable substrate layer, at least when the stamping element presses the magnetic stripe material layer. It is possible that the carrier substrate layer will vanish during or shortly after the pressing step. The heat-activatable substrate layer, when being activated, may change its material characteristics. For example, the heat-activatable substrate layer will undergo a curing or hardening process which attaches the portion of the magnetic stripe material layer onto the card element surface.

According to an embodiment, the card element is a cover layer of the card-like data carrier, wherein the method further comprises providing a base structure comprising one or more structural base layers and applying, e.g., attaching or bonding, the card element to the base structure before or after pressing the portion of the magnetic stripe material layer against the card element surface.

That is, the card element may only be an uppermost or lowermost layer of the final card-like data carrier. For example, the card element may be a transparent outer layer or foil, herein also referred to as overlay, that covers the inner base structure of the card-like data carrier. It is possible that the above-described step of pressing the portion of the magnetic stripe material layer is performed in the presence of the card element only, wherein the base structure is not yet present. In this case, the overlay including the applied magnetic stripe may be attached to the base structure afterwards. However, in contrast, it is also possible that the above-described step of pressing the portion of the magnetic stripe material layer is carried out when the overlay is already attached to the base structure.

According to another aspect, a method for manufacturing a magnetic stripe of a card-like data carrier is provided. In a step of the method, a card element having a card element surface is provided. In a further step, a roller element is arranged spaced apart from the card element surface, wherein the roller element comprises a plurality of functional elements spaced apart from each other around a circumference of the roller element. In a further step, a magnetic stripe material layer is arranged between the card element surface and the roller element. In a further step, the roller element is rotated relative to the card element surface and relative to the magnetic stripe material layer. In yet a further step, at least a first portion of the magnetic stripe material layer is pressed against the card element surface using a first functional element of the plurality of functional elements, when rotating the roller element. In a further step, a heat amount is applied onto the first portion of the magnetic stripe material layer using the roller element, when pressing the first portion of the magnetic stripe material layer against the card element surface. Pressing the first portion of the magnetic stripe material layer against the card element surface generates a first magnetic stripe on the card element surface such that the first magnetic stripe has a stripe length that is less than a length of the card element surface and has a stripe width that is less than a width of the card element surface.

With this alternative inventive method, it is possible to provide a magnetic stripe on the card element which does not extend over the entire surface of the card element. This second method for manufacturing the magnetic stripe of the card-like data carrier described herein employs a roller element that may be configured to press the magnetic stripe material onto the card element surface at discrete and/or spatially separated surface portions. Simultaneously, a heat amount may be applied onto the magnetic stripe material and/or onto surface portions of the card element surface where the magnetic stripe material will currently be applied.

The roller element is spaced apart from the card element surface and the magnetic stripe material layer is arranged between the card element surface and the roller element. Afterwards, the roller element may be rotated relative to the card element surface and relative to the magnetic stripe material layer. The functional elements which are spaced apart from each other in a circumferential direction of the roller element may comprise or constitute multiple stamping elements, such as the stamping element described above with respect to the first method. In particular, the functional elements may be in the form of protrusions or blocks on the outer perimeter of the roller element. The rotation of the roller element may thus functionally cooperate with pressing the first functional element against the first portion of the magnetic stripe material layer and towards the card element surface. In particular, when rotating the roller element, there will be a specified orientation of the roller element where the first functional element directly faces the magnetic stripe material layer, i.e., the first functional element may lie on an axis which extends through the center of the roller element and which is perpendicular with respect to the card element surface. In this orientation, the first functional element may press the first portion of the magnetic stripe material layer against the card element surface since the first portion of the magnetic stripe material layer is directly positioned between the first functional element and the card element surface.

It is noted that a heat amount is applied onto the first portion of the magnetic stripe material layer using the roller element, for example the functional element that currently presses the portion of the magnetic stripe material layer against the card element surface. In particular, a temperature in a region around said portion of the magnetic stripe material layer can be increased to facilitate attaching the portion of the magnetic stripe material layer onto the card element surface. The heat may be provided via the roller element itself, for example via the functional elements, and transferred into the respective portions of the magnetic stripe material layer.

As explained above, the first portion of the magnetic stripe material layer may be applied onto the card element surface, thereby generating the final shape of the magnetic stripe on the card element surface. In particular, the first portion of the magnetic stripe material layer may be applied to the card element surface such that the stripe length does not extend over the entire card element length, but rather extends only over a part of the card element length. The final magnetic stripe may also have a specified width that does also not extend over the entire width of the card element. In other words, the manufactured magnetic stripe is again limited in its dimensions to only a smaller part within the card element surface.

According to an embodiment, the method further comprises arranging the magnetic stripe material layer between a carrier substrate layer and a heat-activatable substrate layer, wherein pressing the first portion of the magnetic stripe material layer against the card element surface comprises pressing the first portion of the magnetic stripe material layer together with a first portion of the carrier substrate layer and a first portion of the heat-activatable substrate layer towards the card element surface. In this case, applying the heat amount onto the first portion of the magnetic stripe material layer comprises activating the first portion of the heat-activatable substrate layer using the roller element, thereby providing an adhesion between the first portion of the magnetic stripe material layer and the card element surface.

The characteristics and functions of the carrier substrate layer and of the heat-activatable substrate layer as described above with respect to the first method may also apply to the carrier substrate layer and to the heat-activatable substrate layer as implemented by the second method.

According to an embodiment, the method further comprises pressing at least a second portion of the magnetic stripe material layer against the card element surface using a second functional element of the plurality of functional elements, when further rotating the roller element, and applying a heat amount onto the second portion of the magnetic stripe material layer using the roller element, when pressing the second portion of the magnetic stripe material layer against the card element surface.

Since the first and second functional elements are circumferentially spaced apart on the roller element, these functional elements will subsequently or consecutively be in an orientation relative to the magnetic stripe material layer in which said functional elements are able to press the respective portions of the magnetic stripe material layer against the card element surface. In particular, the first functional element may press the first portion of the magnetic stripe material layer against the card element surface timely before the second functional element presses the second portion of the magnetic stripe material layer against the card element surface.

According to an embodiment, pressing the second portion of the magnetic stripe material layer against the card element surface generates a second magnetic stripe on the card element surface such that the second magnetic stripe has a stripe length that is less than a length of the card element surface and has a stripe width that is less than a width of the card element surface.

Therefore, the dimensional characteristics of the generated first magnetic stripe may also apply for the dimensional characteristics of the generated second magnetic stripe.

According to an embodiment, the first magnetic stripe and the second magnetic stripe are generated on the card element surface such that the first magnetic stripe and the second magnetic stripe are spaced apart from each other on the card element surface by a predetermined distance that corresponds to a circumferential distance between the functional elements on the roller element.

In other words, the circumferential distance of the functional elements on the roller element may be adjusted or chosen which determines the final distance between the generated magnetic stripes of the card element surface. The following may apply: The larger the circumferential distance between the functional elements on the roller element, the larger the distance between the generated magnetic stripes of the card element surface.

According to an embodiment, the card element is a cover layer of the card-like data carrier, wherein the method further comprises providing a base structure comprising one or more structural base layers and applying, e.g., attaching or bonding, the card element to the base structure before or after pressing the first portion of the magnetic stripe material layer against the card element surface.

The above explanations with respect to the card element of the first method as well as its treatment modalities within the first method may also apply to the card element as used by the second method.

According to another aspect, a method for manufacturing a magnetic stripe of a card-like data carrier is provided. In a step of the method, a card element having a card element surface is provided. In another step, a silkscreen print element is arranged relative to the card element surface. In another step, a magnetic stripe material is printed onto the card element surface using the silkscreen print element, wherein printing the magnetic stripe material onto the card element surface generates a magnetic stripe on the card element surface such that the magnetic stripe has a stripe length that is less than a length of the card element surface and has a stripe width that is less than a width of the card element surface.

With this alternative inventive method, it is also possible to provide a magnetic stripe on the card element which does not extend over the entire surface of the card element.

This third method for manufacturing the magnetic stripe of the card-like data carrier described herein employs a silkscreen print element that may be configured to print the magnetic stripe material onto the card element surface. The card element may represent the uppermost layer of the card-like data carrier to be manufactured. Therefore, the card element may comprise a card-like structure or a foil like structure which may be applied to a base structure of the card-like data carrier as described herein.

The silkscreen print element, for example a blade or similar component, may be arranged adjacent the card element surface such that the magnetic stripe material can be applied onto the card element surface via the silkscreen print element. A stencil or a screen may be used to define a shape of magnetic stripe or a pattern of magnetic stripes on the card element surface. The stencil or screen may be adapted to prevent the magnetic stripe material being applied to certain regions on the card element surface. The magnetic stripe material may be present in the form of a solid material, a liquid material or as particulate matter or powder, when being applied onto the card element surface.

As explained above, the magnetic stripe material may be applied onto the card element surface, thereby generating the final shape of the magnetic stripe on the card element surface. In particular, the magnetic stripe material may be applied to the card element surface such that the stripe length does not extend over the entire card element length, but rather extends only over a part of the card element length. The final magnetic stripe may also have a specified width that does also not extend over the entire width of the card element. In other words, the manufactured magnetic stripe is limited in its dimensions to only a smaller part within the card element surface.

According to an embodiment, the card element is a cover layer of the card-like data carrier, wherein the method further comprises providing a base structure comprising one or more structural base layers and applying, e.g., attaching or bonding, the card element to the base structure before or after printing the magnetic stripe material onto the card element surface, thereby providing a laminated structure of at least the card element and the base structure.

The card element may only be an uppermost or lowermost layer of the final card-like data carrier. For example, the card element may be a transparent outer layer or foil, herein also referred to as overlay, that covers the inner base structure of the of the card-like data carrier. It is possible that the above-described step of applying the magnetic stripe material is performed in the presence of the card element only, wherein the base structure is not yet present. In this case, the overlay including the applied magnetic stripe may be attached to the base structure afterwards. However, in contrast, it is also possible that the above-described step of applying the magnetic stripe material is carried out when the overlay is already attached to the base structure.

According to an embodiment, the method further comprises cutting the laminated structure to a predetermined size in order to provide the card-like data carrier.

That is, the magnetic stripe material may be printed on the overlay and during the card manufacturing process it may be applied to other foil layers of the base structure. In a further step, all foils may be laminated and the card-like data carrier is cut into shape, e.g., punched out, from a laminated sheet that comprises the base structure and the card element. The short magnetic stripe will then be present on the final card-like data carrier.

According to another aspect, a method for manufacturing a magnetic stripe of a card-like data carrier is provided. In a step of the method, a card element having a card element surface is provided. In another step, a tape application element is arranged relative to the card element surface. In another step, a tape element that at least comprises a magnetic stripe material layer is provided. In yet another step, the tape element including the magnetic stripe material layer is attached to the card element surface using the tape application element. Attaching the tape element including the magnetic stripe material layer onto the card element surface generates a magnetic stripe on the card element surface such that the resulting magnetic stripe has a stripe length that is less than a length of the card element surface and has a stripe width that is less than a width of the card element surface.

With this alternative inventive method, it is possible to provide a magnetic stripe on the card element which does not extend over the entire surface of the card element. This fourth method for manufacturing the magnetic stripe of the card-like data carrier described herein employs a tape application element that may be configured to print the magnetic stripe material, for example on a carrier tape, onto the card element surface. In other words, the magnetic stripe material layer can be provided on a carrier tape and can be applied to the surface of the card element like a sticker. The tape application element may be a sticker application machine or label application machine.

As explained above, the magnetic stripe material layer may be applied onto the card element surface, thereby generating the final shape of the magnetic stripe on the card element surface. In particular, the tape element including the magnetic stripe material layer is applied to the card element surface such that the resulting stripe length does not extend over the entire card element length, but rather extends only over a part of the card element length. The final magnetic stripe may also have a specified width that does also not extend over the entire width of the card element. In other words, the manufactured magnetic stripe is limited in its dimensions to only a smaller part within the card element surface.

According to an embodiment, attaching the tape element including the magnetic stripe material layer onto the card element surface comprises providing an adhesion between the magnetic stripe material layer and the card element surface.

For example, the magnetic stripe material layer may be applied onto the card element surface like a sticker having an adhesive for providing an adhesive force which attaches the magnetic stripe material layer to the card element surface.

As can be derived from the above explanations, various methods can be used to provide the magnetic stripe on the card element, wherein the resulting magnetic stripe, in either direction, does not extend over the entire surface of the card element. Therefore, the inventive methods provide alternative solutions for improving the manufacturing of magnetic stripes for card-like data carriers.

The above explanations with respect to the different methods as well as their different treatment modalities can be freely combined with each other if technically reasonable.

BRIEF DESCRIPTION OF THE DRAWINGS

The present invention will hereinafter be described in conjunction with the following drawing figures, wherein like numerals denote like elements, and wherein.

DETAILED DESCRIPTION OF EXEMPLARY EMBODIMENTS

Figure 1:
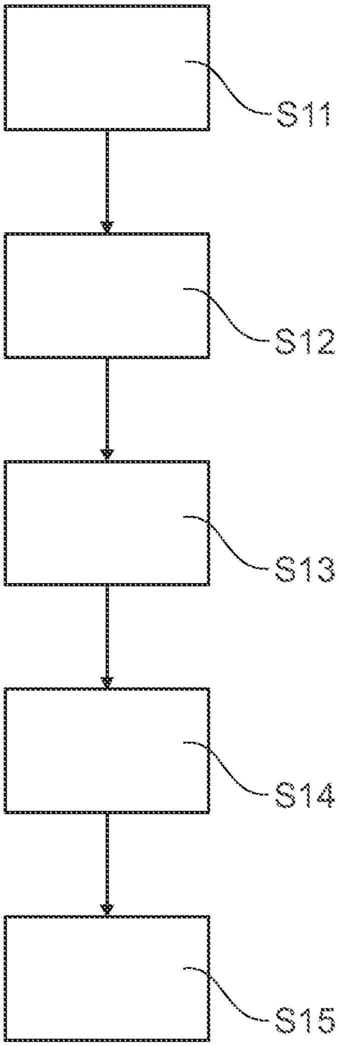
FIG. 1 shows a flow diagram of a method for manufacturing a magnetic stripe of a card-like data carrier.

The representations and illustrations in the drawings may be schematic and not to scale. A better understanding of the method and system described above may be obtained through a review of the shown illustrations together with a review of the detailed description that follows.

Figure 2:
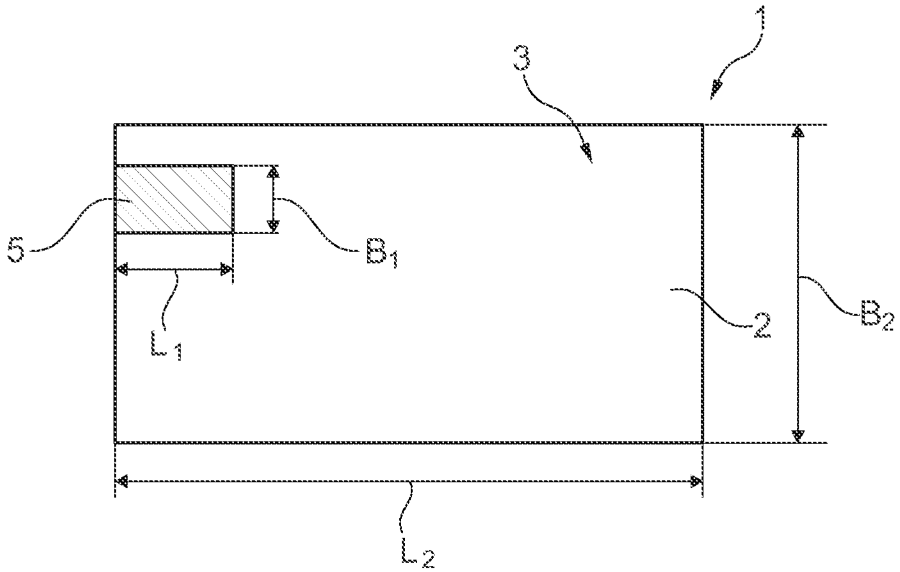
FIG. 2 shows a card-like data carrier with a magnetic stripe.

FIG. 1 shows a flow diagram of a method for manufacturing a magnetic stripe of a card-like data carrier, for example the magnetic stripe 5 of the card-like data carrier 1 as shown in FIG. 2. In a step S11, the method comprises providing a card element having a card element surface. In a step S12, the method comprises arranging a stamping element spaced apart from the card element surface. In a step S13, the method comprises arranging a magnetic stripe material layer between the card element surface and the stamping element. In a step S14, the method comprises pressing a portion of the magnetic stripe material layer against the card element surface using the stamping element. In a step S15, the method comprises applying a heat amount onto at least the portion of the magnetic stripe material layer using the stamping element, when pressing the portion of the magnetic stripe material layer against the card element surface. Pressing the portion of the magnetic stripe material layer against the card element surface generates a magnetic stripe on the card element surface such that the magnetic stripe has a stripe length that is less than a length of the card element surface and has a stripe width that is less than a width of the card element surface. In an example, the method steps are performed in the indicated order.

FIG. 2 shows a card-like data carrier 1 having a magnetic stripe 5 applied thereto by means of one of the various methods described herein. In particular, the methods as described herein enable improved manufacturing techniques to apply the magnetic stripe 5 onto the card element surface 3 of the card element 2. As can be seen in FIG. 2, the magnetic stripe 5 has a reduced length $L_1$. This means that a magnetic stripe material layer, which is further explained below, can be pressed against the card element surface 3 to generate the magnetic stripe 5 on the card element surface 3 such that the magnetic stripe 5 has a stripe length $L_1$ that is less than a length $L_2$ of the card element surface 3 and has a stripe width $B_1$ that is less than a width $B_2$ of the card element surface 3.

In other words, the inventive methods described herein can apply a portion of magnetic stripe material layer onto the card element surface 3, thereby generating the final shape of the magnetic stripe 5 on the card element surface 3 as, for instance, illustrated in FIG. 1. In particular, a portion of the magnetic stripe material may be applied to the card element surface 3 such that the stripe length $L_1$ does not extend over the entire card element length $L_2$, but rather extends only over a part of the card element length $L_2$. The final magnetic stripe 5 may also have a specified width $B_1$ that does also not extend over the entire width $B_2$ of the card element 2. In other words, the manufactured magnetic stripe 5 is limited in its dimensions to only a smaller part or area within the card element surface 3. It is noted that the ends or edges of the card element 2 or the card-like data carrier 1 may define the card element length $L_2$ and the card element width $B_2$, respectively. In the illustrated example, the card element 2 has four edges, wherein, in a length direction, the magnetic stripe 5 starts at a first edge and ends at a specified distance before reaching a second edge that is oppositely located to the first edge. In a width direction, the magnetic stripe 5 starts at a specified distance away from a third edge and ends at a specified distance before reaching a fourth edge that is oppositely located to the third edge. Other configurations may be possible. For example, the magnetic stripe 5 may be generated such that it is spaced apart by specified distances from all four edges.

Figure 3:
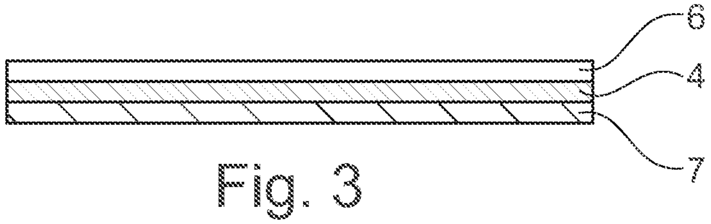
FIG. 3 shows a layer composition used for manufacturing a magnetic stripe of a card-like data carrier.

FIG. 3 shows a layer composition or layer stack used for manufacturing a magnetic stripe 5 of a card-like data carrier 1, for example the magnetic stripe 5 of the card-like data carrier 1 as shown in FIG. 2. A magnetic stripe material layer 4 is arranged between a carrier substrate layer 6 and a heat-activatable substrate layer 7. In particular, the magnetic stripe material layer 4 may be sandwiched between the carrier substrate layer 6 and the heat-activatable substrate layer 7. The carrier substrate layer 6 may act as a carrier, protection or form stabilizer for the magnetic stripe material layer 4 and the heat-activatable substrate layer 7 may act as an adhesive for attaching the magnetic stripe material layer 4 to the card element surface when being activated. The heat-activatable substrate layer 7 may be a hot melt.

Figure 4:
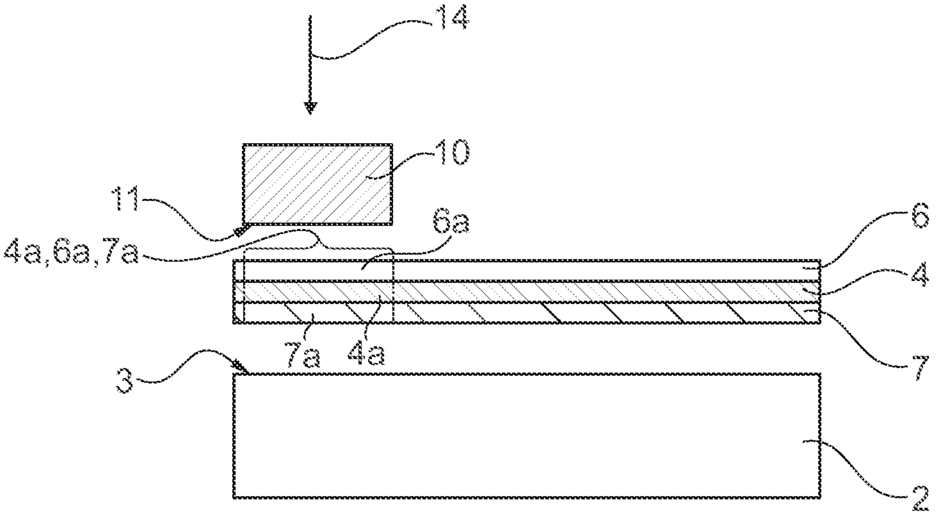
FIG. 4 shows a stamping element for manufacturing a magnetic stripe of a card-like data carrier.

FIG. 4 shows a stamping element 10 for manufacturing the magnetic stripe 5 of the card-like data carrier 1 as shown in FIG. 2. As described with respect to the method of FIG. 1, a portion 4*a* of the magnetic stripe material layer 4 can be pressed against the card element surface 3 which comprises pressing or pushing the portion 4*a* of the magnetic stripe material layer 4 together with a portion 6*a* of the carrier substrate layer 6 and a portion 7*a* of the heat-activatable substrate layer 7 towards the card element surface 3. The direction 14 of the stamping element 10 during the pressing procedure is indicated by an arrow in FIG. 4. Simultaneously, heat can be applied onto the portion 4*a* of the magnetic stripe material layer 4 and also the portion 7*a* of the heat-activatable substrate layer 7, such that the portion 7*a* of the heat-activatable substrate layer 7 can be activated by the heat transferred from the stamping element 10. The activation of the portion 7*a* of the heat-activatable substrate layer 7 during the pressing procedure provides an adhesion generated between the portion 4*a* of the magnetic stripe material layer 4 and the card element surface 3 of the card element 2 in order to finally attach the magnetic stripe 5 as shown in FIG. 2 above.

In view of FIG. 4, it may be noted that the layer composition or layer stack of the layers 4, 6 and 7 may laterally extend beyond the portions 4*a*, 6*a* and 7*a* of these layers 4, 6 and 7 that are actually pressed against the card element surface 3. Accordingly, pressing the portion 4*a* of the magnetic stripe material layer 4 against the card element surface 3 may comprise pressing only the portion 4*a* of the larger magnetic stripe material layer 4 that faces a stamping surface 11 of the stamping element 10.

Figure 5:
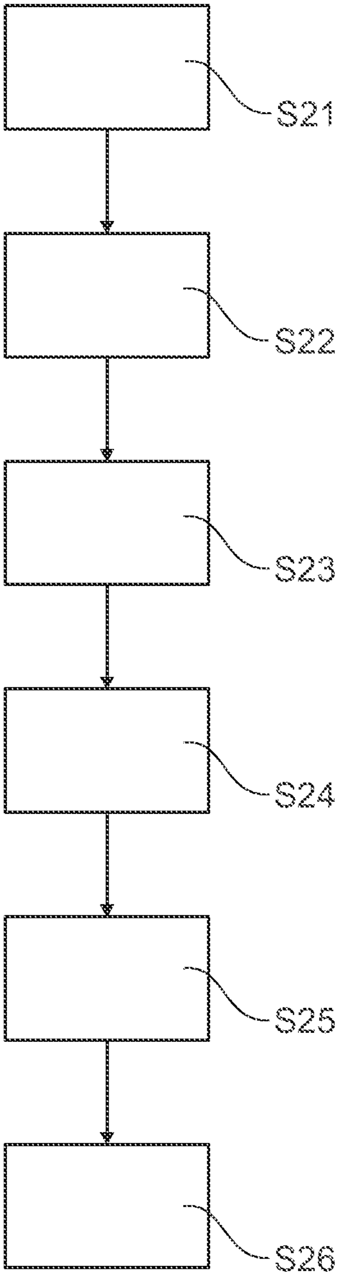
FIG. 5 shows a flow diagram of another method for manufacturing a magnetic stripe of a card-like data carrier.

FIG. 5 shows a flow diagram of another method for manufacturing a magnetic stripe of a card-like data carrier, for example the magnetic stripe 5 of the card-like data carrier 1 as shown in FIG. 2. In a step S21, the method comprises providing a card element having a card element surface. In a step S22, the method comprises arranging a roller element spaced apart from the card element surface, wherein the roller element comprises a plurality of functional elements, herein also referred to as roller segments, spaced apart from each other around a circumference of the roller element. In a step S23, the method comprises arranging a magnetic stripe material layer between the card element surface and the roller element. In a step S24, the method comprises rotating the roller element relative to the card element surface and relative to the magnetic stripe material layer. In a step S25, the method comprises pressing a first portion of the magnetic stripe material layer against the card element surface using a first functional element of the plurality of functional elements, when rotating the roller element. In a step S26, the method comprises applying a heat amount onto the first portion of the magnetic stripe material layer using the roller element, when pressing the first portion of the magnetic stripe material layer against the card element surface. Pressing the first portion of the magnetic stripe material layer against the card element surface generates a first magnetic stripe on the card element surface such that the first magnetic stripe has a stripe length that is less than a length of the card element surface and has a stripe width that is less than a width of the card element surface. In an example, the method steps are performed in the indicated order.

Figure 6:
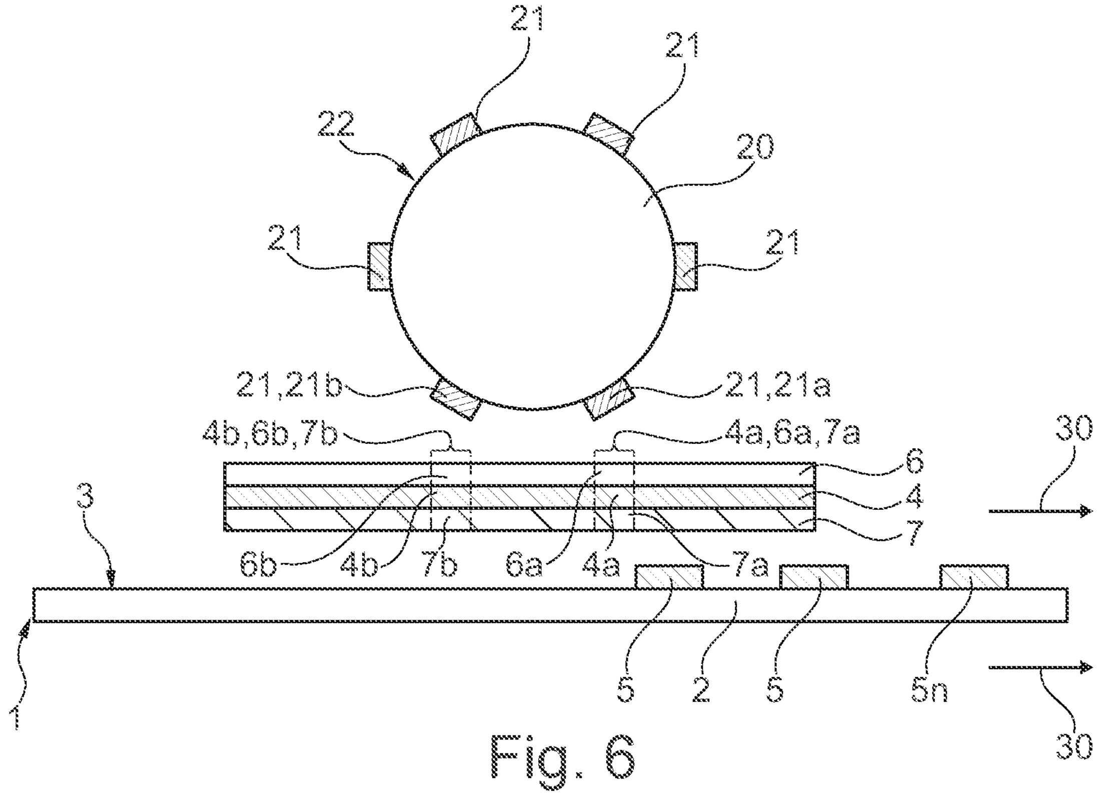
FIG. 6 shows a roller element for manufacturing a magnetic stripe of a card-like data carrier.

FIG. 6 shows a roller element 20 for manufacturing a magnetic stripe of a card-like data carrier, for example the magnetic stripe 5 of the card-like data carrier 1 as shown in FIG. 2. A card element 2 comprises a card element surface 3 and is arranged paced apart from the roller element 20. The roller element 20 comprises a plurality of functional elements 21, for example stamp elements or stamp segments, being spaced apart from each other around a circumference 22 or perimeter 22 of the roller element 20. Furthermore, at least the magnetic stripe material layer 4 is placed between the card element surface 3 and the roller element 20. The roller element 20 may be configured to press a first portion 4*a* of the magnetic stripe material layer 4 against the card element surface 3 using a first functional element 21*a* of the plurality of functional elements 21, when rotating the roller element 20. In addition, a heat amount can be applied onto the first portion 4*a* of the magnetic stripe material layer 4 using the roller element 20, e.g., using the first functional element 21*a*, when pressing the first portion 4*a* of the magnetic stripe material layer 4 against the card element surface 3. Afterwards, a second portion 4*b* of the magnetic stripe material layer 4 can be pressed against the card element surface 3 using a second functional element 21*b* of the plurality of functional elements 21, when further rotating the roller element 20. Accordingly, a heat amount can also be transferred onto the second portion 4*b* of the magnetic stripe material layer 4 using the roller element 20, e.g., using the first functional element 21*a*, when pressing the second portion 4*b* of the magnetic stripe material layer 4 against the card element surface 3.

Since the first and second functional elements 21*a*, 21*b* are circumferentially spaced apart on the roller element 20, these functional elements 21*a*, 21*b* will, at respective times, subsequently be in an orientation relative to the magnetic stripe material layer 4 in which these functional elements 21*a*, 21*b* can press the respective portions 4*a*, 4*b* of the magnetic stripe material layer 4 against the card element surface 3. In particular, the first functional element 21*a* may press the first portion 4*a* of the magnetic stripe material layer 4 against the card element surface 3 timely before the second functional element 21*b* presses the second portion 4*b* of the magnetic stripe material layer 4 against the card element surface 3.

As can also be derived from FIG. 6, a composition or stack of the magnetic stripe material layer 4, a carrier substrate layer 6 and a heat-activatable substrate layer 7 can be provided in the same manner as described above with respect to FIG. 3. Pressing the first portion 4*a* of the magnetic stripe material layer 4 against the card element surface 3 may thus comprise pressing, by the first functional element 21*a*, the first portion 4*a* of the magnetic stripe material layer 4 together with a first portion 6*a* of the carrier substrate layer 6 and a first portion 7*a* of the heat-activatable substrate layer 7 towards the card element surface 3. Afterwards, i.e., after further rotating the roller element 20, the second functional element 21*b* can press the second portion 4*b* of the magnetic stripe material layer 4 together with a second portion 6*b* of the carrier substrate layer 6 and a second portion 7*b* of the heat-activatable substrate layer 7 towards the card element surface 3. During the rotation of the roller element 20, the layers 4, 6 and 7 and/or the processed card element 2 can be moved in a direction 30 as indicated by arrows in FIG. 6.

The pressing by the first functional element 21*a* may result in a first magnetic stripe 5 on the card element surface 3, wherein this first magnetic stripe 5 has a stripe length that is less than a length of the card element surface 3 and has a stripe width that is less than a width of the card element surface 3, similar as shown in FIG. 2. The pressing by the second functional element 21*b* may result in a second magnetic stripe 5 on the card element surface 3, wherein this second magnetic stripe 5 also has a stripe length that is less than a length of the card element surface 3 and has a stripe width that is less than a width of the card element surface 3, similar as shown in FIG. 2. The first magnetic stripe 5 and the second magnetic stripe 5 may be generated on the card element surface 3 such that the first magnetic stripe 5 and the second magnetic stripe 5 are spaced apart from each other on the card element surface 3 by a predetermined distance, as shown in FIG. 6, wherein the predetermined distance corresponds to a circumferential distance between the functional elements 21 on the roller element 20. In the same manner, a plurality of further magnetic stripes 5*n* can be applied to the card element surface 3.

Figure 7:
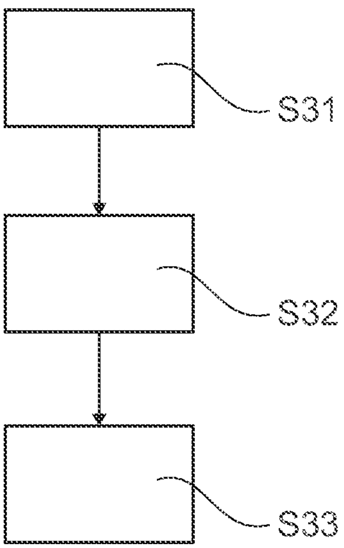
FIG. 7 shows a flow diagram of another method for manufacturing a magnetic stripe of a card-like data carrier.

FIG. 7 shows a flow diagram of another method for manufacturing a magnetic stripe of a card-like data carrier, for example the magnetic stripe 5 of the card-like data carrier 1 as shown in FIG. 2. In a step S31, the method comprises providing a card element having a card element surface. In another step S32, the method comprises arranging a silkscreen print element relative to the card element surface. In another step S32, the method comprises printing a magnetic stripe material onto the card element surface using the silkscreen print element. Printing the magnetic stripe material onto the card element surface generates a magnetic stripe on the card element surface such that the magnetic stripe has a stripe length that is less than a length of the card element surface and has a stripe width that is less than a width of the card element surface. In an example, the method steps are performed in the indicated order.

Figure 8:
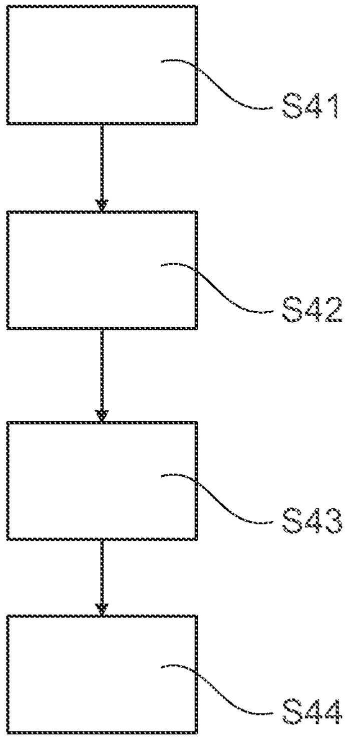
FIG. 8 shows a flow diagram of another method for manufacturing a magnetic stripe of a card-like data carrier.

FIG. 8 shows a flow diagram of another method for manufacturing a magnetic stripe of a card-like data carrier, for example the magnetic stripe 5 of the card-like data carrier 1 as shown in FIG. 2. In a step S41, the method comprises providing a card element having a card element surface. In another step S42, the method comprises arranging a tape application element relative to the card element surface. In a step S43, the method comprises providing a tape element that at least comprises a magnetic stripe material layer. In a step S44, the method comprises attaching the tape element including the magnetic stripe material layer onto the card element surface using the tape application element. Attaching the tape element including the magnetic stripe material layer onto the card element surface generates a magnetic stripe on the card element surface such that the magnetic stripe has a stripe length that is less than a length of the card element surface and has a stripe width that is less than a width of the card element surface. In an example, the method steps are performed in the indicated order.

The invention claimed is:

1. A method for manufacturing a magnetic stripe of a data carrier, comprising:

providing a card element having a card element surface;

arranging a stamping element spaced apart from the card element surface;

arranging a magnetic stripe material layer between the card element surface and the stamping element;

arranging the magnetic stripe material layer between a carrier substrate layer and a heat-activatable substrate layer;

pressing at least a portion of the magnetic stripe material layer against the card element surface using the stamping element;

applying a heat amount onto the portion of the magnetic stripe material layer using the stamping element, when pressing the portion of the magnetic stripe material layer against the card element surface, wherein heat is transferred from the stamping element through the magnetic stripe material layer to the heat-activatable substrate layer;

wherein pressing the portion of the magnetic stripe material layer against the card element surface generates a magnetic stripe on the card element surface such that the magnetic stripe has a stripe length that is less than a length of the card element surface and has a stripe width that is less than a width of the card element surface;

wherein pressing the portion of the magnetic stripe material layer against the card element surface comprises pressing the portion of the magnetic stripe material layer together with a portion of the carrier substrate layer and a portion of the heat-activatable substrate layer towards the card element surface;

wherein pressing the portion of the magnetic stripe material layer against the card element surface comprises pressing only the portion of the magnetic stripe material layer that faces a stamping surface of the stamping element;

wherein the card element is a cover layer of the data carrier;

wherein the method further comprises:

providing a base structure comprising one or more structural base layers; and applying the card element to the base structure before or after pressing the portion of the magnetic stripe material layer against the card element surface.

2. The method of claim 1, wherein applying the heat amount onto the portion of the magnetic stripe material layer comprises activating the portion of the heat-activatable substrate layer using the stamping element, thereby providing an adhesion between the portion of the magnetic stripe material layer and the card element surface.

3. A method for manufacturing a magnetic stripe of a data carrier, comprising:

providing a card element having a card element surface;

arranging a roller element spaced apart from the card element surface, wherein the roller element comprises a plurality of functional elements spaced apart from each other around a circumference of the roller element;

arranging a magnetic stripe material layer between the card element surface and the roller element;

rotating the roller element relative to the card element surface and relative to the magnetic stripe material layer;

pressing at least a first portion of the magnetic stripe material layer against the card element surface using a first functional element of the plurality of functional elements, when rotating the roller element;

applying a heat amount onto the first portion of the magnetic stripe material layer using the roller element, when pressing the first portion of the magnetic stripe material layer against the card element surface;

wherein pressing the first portion of the magnetic stripe material layer against the card element surface generates a first magnetic stripe on the card element surface such that the first magnetic stripe has a stripe length that is less than a length of the card element surface and has a stripe width that is less than a width of the card element surface.

4. The method of claim 3, further comprising:

arranging the magnetic stripe material layer between a carrier substrate layer and a heat-activatable substrate layer;

wherein pressing the first portion of the magnetic stripe material layer against the card element surface comprises pressing the first portion of the magnetic stripe material layer together with a first portion of the carrier substrate layer and a first portion of the heat-activatable substrate layer towards the card element surface;

wherein applying the heat amount onto the first portion of the magnetic stripe material layer comprises activating the first portion of the heat-activatable substrate layer using the roller element, thereby providing an adhesion between the first portion of the magnetic stripe material layer and the card element surface.

5. The method of claim 3, further comprising:

pressing at least a second portion of the magnetic stripe material layer against the card element surface using a second functional element of the plurality of functional elements, when further rotating the roller element; and/or applying a heat amount onto the second portion of the magnetic stripe material layer using the roller element, when pressing the second portion of the magnetic stripe material layer against the card element surface.

6. The method of claim 5, wherein pressing the second portion of the magnetic stripe material layer against the card element surface generates a second magnetic stripe on the card element surface such that the second magnetic stripe has a stripe length that is less than a length of the card element surface and has a stripe width that is less than a width of the card element surface.

7. The method of claim 6, wherein the first magnetic stripe and the second magnetic stripe are generated on the card element surface such that the first magnetic stripe and the second magnetic stripe are spaced apart from each other on the card element surface by a predetermined distance that corresponds to a circumferential distance between the functional elements on the roller element.

8. The method of any one of claim 3, wherein the card element is a cover layer of the data carrier;

further comprising:

providing a base structure comprising one or more structural base layers;

applying the card element to the base structure before or after pressing the first portion of the magnetic stripe material layer against the card element surface.

9. A method for manufacturing a magnetic stripe of a data carrier, comprising:

providing a card element having a card element surface;

arranging a silkscreen print element relative to the card element surface;

printing a magnetic stripe material onto the card element surface using the silkscreen print element;

wherein printing the magnetic stripe material onto the card element surface generates a magnetic stripe on the card element surface such that the magnetic stripe has a stripe length that is less than a length of the card element surface and has a stripe width that is less than a width of the card element surface;

wherein a stencil is used to define a shape of magnetic stripe on the card element surface; and wherein the stencil is adapted to prevent the magnetic stripe material being applied to certain regions on the card element surface;

wherein the card element is a cover layer of the data carrier;

wherein the method further comprises:

providing a base structure comprising one or more structural base layers; and applying the card element to the base structure before or after printing the magnetic stripe material onto the card element surface, thereby providing a laminated structure of at least the card element and the base structure wherein the silkscreen print element includes a silkscreen blade;

wherein the card element includes a transparent outer layer or foil arranged to cover an inner base structure of the data carrier; and wherein the magnetic stripe material is also applied to the one or more structural base layers.

10. The method of claim 9, cutting the laminated structure to a predetermined size in order to provide the data carrier.

11. A method for manufacturing a magnetic stripe of a data carrier, comprising:

providing a card element having a card element surface;

arranging a tape application element relative to the card element surface;

providing a tape element that at least comprises a magnetic stripe material layer;

attaching the tape element including the magnetic stripe material layer onto the card element surface using the tape application element;

wherein attaching the tape element including the magnetic stripe material layer onto the card element surface generates a magnetic stripe on the card element surface such that the magnetic stripe has a stripe length that is less than a length of the card element surface and has a stripe width that is less than a width of the card element surface;

wherein attaching the tape element including the magnetic stripe material layer onto the card element surface comprises providing an adhesion between the magnetic stripe material layer and the card element surface;

wherein the tape element comprises a carrier tape layer and magnetic stripe material layer, and that an adhesive layer provides an adhesive force which attaches the magnetic stripe material layer to the card element surface;

wherein the tape application element is a label application machine configured to print magnetic stripe material onto the card element surface; and wherein the tape element includes a carrier layer configured as a form stabilizer for the magnetic stripe material layer.

* * * * *